(No Model.)
W. L. CARD & J. C. DANE.
DRY ORE SEPARATOR.
No. 300,042. Patented June 10, 1884.
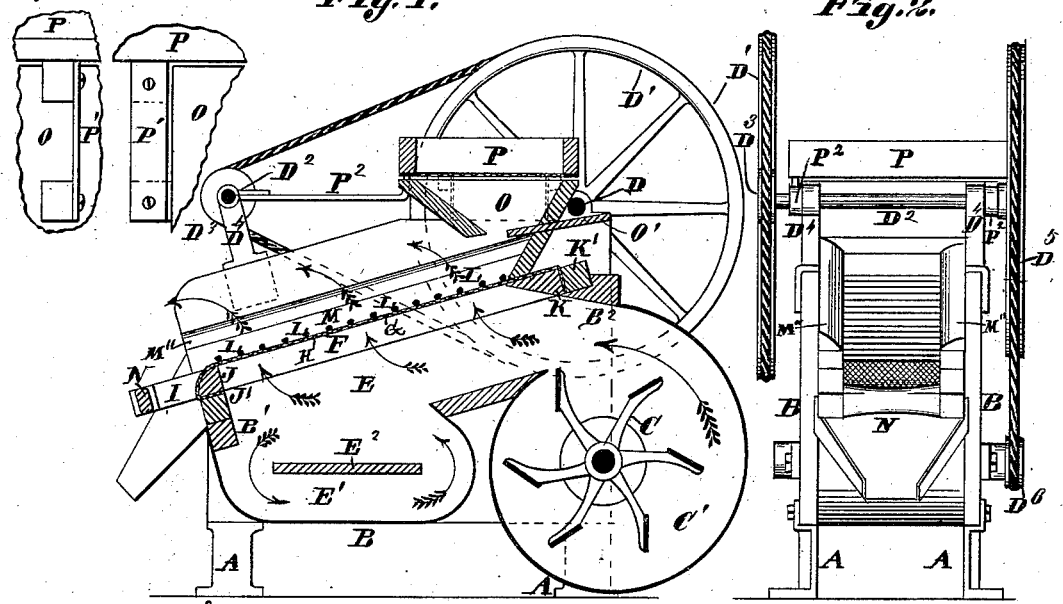
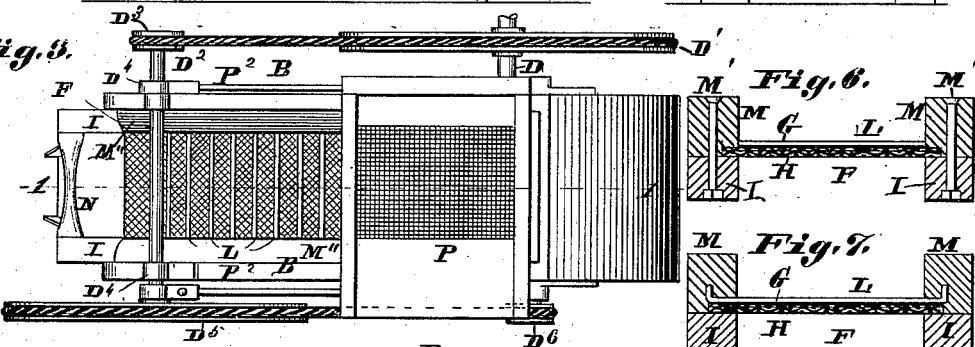
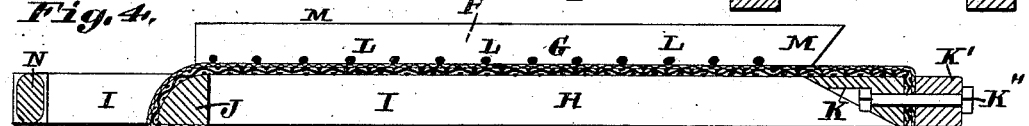
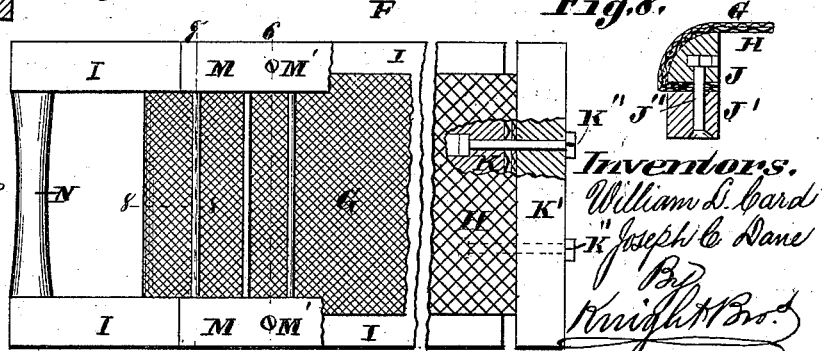
Attest,
Charles Pickles
Wm. J. Sayers
Inventors.
William L. Card
Joseph C. Dane
By Knight Bros.
Attys
N. PETERS, Photo-Lithographer, Washington, D. C.

UNITED STATES PATENT OFFICE.

WILLIAM L. CARD AND JOSEPH C. DANE, OF LA CROSSE, WISCONSIN, ASSIGNORS TO THE CARD-DANE DRY GOLD SLUICE COMPANY, (LIMITED,) OF SAME PLACE.

DRY ORE SEPARATOR.

SPECIFICATION forming part of Letters Patent No. 300,042, dated June 10, 1884.

Application filed July 12, 1883. (No model.)

*To all whom it may concern:*

Be it known that we, WILLIAM L. CARD and JOSEPH C. DANE, both of La Crosse, in the county of La Crosse and State of Wisconsin, have invented a certain new and useful Improvement in Dry Ore Separators, of which the following is a full, clear, and exact description, reference being had to the accompanying drawings, forming part of this specification, and in which—

Figure 1 is a longitudinal section taken on line 1 1, Fig. 3. Fig. 2 is a rear view. Fig. 3 is a top view. Fig. 4 is a longitudinal section of the sluice-bed; and Fig. 5 a top view of same, part broken away. Figs. 6 and 7 are transverse sections taken, respectively, on lines 6 6 and 7 7, Fig. 5. Fig. 8 is a detail section taken on line 8 8, Fig. 5. Figs. 9 and 10 are detail views illustrating the manner of supporting the screen above the hopper.

Our invention relates to dry ore separators in which an inclined ore-bed having riffles to impede the passage of the precious metal, and a continuous air-current to assist the removal of the lighter foreign material, are employed, our improvement consisting in features of novelty hereinafter fully described, and pointed out in the claims.

Referring to the drawings, A represents suitable supporting-legs, and B the outer walls of the apparatus.

C represents a fan, located in a chamber, C', and provided with suitable driving mechanism. We have represented it as driven by a wheel or pulley, D', on the main driving-shaft D, supported in suitable journal-boxes secured to the frame B. The wheel D' has belt-connection with a small pulley, D³, on a countershaft, D², journaled in suitable boxes, D⁴, secured to the frame. On the other end of the shaft D² from where the pulley D³ is secured is a large pulley or wheel, D⁵, which has belt-connection with a small pulley, D⁶, on the fan-shaft.

E represents an air-chamber which communicates with the fan-chamber, (see Fig. 1,) and it preferably has a lower extension, E', that is provided with a horizontal partition, E², around which the air-blast from the fan is made to circulate, as shown by the arrows, Fig. 1, before it escapes from the chamber, and it is thus more evenly distributed in the chamber before escaping. The air-current passes through the ore-bed in an upwardly and rearwardly inclined direction from the air-chamber.

F represents the sluice-bed, inclined downwardly from the hopper or feeder toward the discharge end, and consisting of a silk or any other suitable textile cloth, G, and a wire-cloth, H, the wire-cloth being beneath the silk and acting as a support thereto. These cloths are clamped and held taut by a frame consisting of side pieces, I, inner end pieces, J K, and outer and lower end pieces, J' K', connected by bolts J" K". (See Figs. 4, 5, and 8.) In securing the cloths to the frame they are first clamped between the end pieces, J J', and then brought over the upper one, J, of these end pieces, whose upper outer corner is rounded off, (see Figs. 1 and 8,) the silk cloth coming on top, and the cloths are then taken forward and clamped between the other end pieces, K K', lapping over and resting upon the side pieces, I. (See Figs. 6, 5, and 7.) Two of the pieces, J K, are secured to the side pieces or stretchers, I, and the other two, J' K', (one at each end,) are separate therefrom, so as to be clamped against the cloth by the bolts J" and K".

Resting upon and in contact with the silk cloth are riffles L, consisting of round rods or bars secured to upper side pieces, M, by their ends being upturned and fitting in recesses in the side pieces. (See Fig. 7.) When the riffles are thus secured to the side pieces, the latter are placed on the side pieces, I, and connected thereto by bolts M', (see Figs. 5 and 6,) and the sluice-bed thus formed is slid beneath guideways M" into the machine from the rear, and when in place rests upon end pieces, B' B². (See Fig. 1.) It is forced in and pulled out by a handle, N, formed by extending the side pieces, I, and connecting them with a suitable bar.

O represents the hopper, located at the upper end of the machine, and provided with a valve, O'. The back part of the hopper, as shown in Fig. 1, should extend down to or nearly to the sluice-bed.

P represents a screen located above the hopper, and supported by thin metal plates P', connecting it with the hopper or frame of the machine. (See Figs. 9 and 10.) These plates are sufficiently flexible to allow the screen to be slightly agitated above the hopper. As a mechanical means for agitating it, we have shown it connected to the shaft $D^2$ by an arm or arms, $P^2$. Eccentrics on the shaft are surrounded by rings formed upon or secured to the arms. (See Fig. 3.)

The operation is as follows: The auriferous material being placed in the screen and the machine started, the material, or the finer and valuable part of it, is sifted into the hopper, whence it passes onto the sluice-bed, the supply being regulated by the valve, while the gravel and coarser parts fall off the screen at one side of machine. The air-current passing up through the sluice-bed carries the sand and foreign matter, carrying more or less gold or precious metal with it, downward, until sooner or later it (the foreign matter) is floated off, while the precious metal, owing to its superior specific gravity, remains on the bed, being lodged against the riffles, which prevent it sliding down the bed, the air-currents not being strong enough to lift it over the riffles. When the desired amount of material has thus been treated, the sluice-bed is taken out of the machine, as described, and the precious metal removed therefrom by simply inverting it, when the operation may be repeated indefinitely.

A machine thus constructed is cheap and durable and most thoroughly effective in its operation.

We use an even steady flow of air, which is caused to pass upward through the bottom of the sluice-box in such manner that the floating or lifting force of the air, in combination with gravity, will have the effect of causing the sand and earth to flow downward through the sluice-box, discharging at the lower end and depositing any gold it may contain against the riffles (on the bottom of the sluice-box) in its passage. The force of the air (say that produced by an ordinary fan at moderate speed) and the pitch of the ore-bed or sluice-bottom (say about fifteen degrees) should be so adjusted as to cause the material operated upon to flow like a liquid, as the object is to float off the waste soil and leave the gold as described, and not to blow it away by a sufficient air-pressure to lift it clear of the ore-bed. It should be distinctly understood that the separation is assisted by the action of the air, and that it requires an even pressure and steady flow of air, and that an intermittent blast of air would not answer our purpose.

The pressure or force of the air-current may be regulated by any suitable contrivance—as, for instance, slides to shut off or regulate the supply of air admitted to the fan.

We claim as our invention—

1. In a dry ore separator, the combination of an inclined ore-bed composed of a suitable frame, fine-meshed wire-cloth, cotton, or other textile fabric superimposed on the wire-cloth, and transeversely-arranged round riffles in close contact throughout their length with the upper surface of the cotton or textile fabric, an air-chamber, and a fan to deliver an even, steady, and continuous upward flow of air through the ore-bed and ore, substantially as herein shown and described.

2. In an ore-separator, the combination of an ore-bed, inclined downwardly from its receiving end toward its discharge end to enable the auriferous material to flow down it, an air-chamber beneath the bed, an extension beneath the air-chamber, having horizontal partition, and means to create a current of air through the air-chamber and around the partition and upward through the bed in a rearwardly direction, as set forth.

3. In an ore-separator, the bed consisting of side pieces, inner end pieces, outer and lower end pieces, wire-cloth, and superimposed textile cloth supported on the side and inner end pieces, and secured by the outer and lower end pieces, and suitable fastenings, the riffles, and upper side pieces and fastenings to secure the riffles in place, as set forth.

WILLIAM L. CARD.
JOSEPH C. DANE.

Witnesses:
ED. M. WING,
JOHN A. DANIELS.